Oct. 28, 1952 — A. N. WATSON — 2,615,733
PIPE FITTING
Filed Feb. 7, 1950

INVENTOR.
ALEXANDER N. WATSON
BY Frank H. Harmon
ATTORNEY

Patented Oct. 28, 1952

2,615,733

UNITED STATES PATENT OFFICE 2,615,733

PIPE FITTING

Alexander N. Watson, East Cleveland, Ohio, assignor of one-half to Joseph A. Rini, Shaker Heights, Ohio Application February 7, 1950, Serial No. 142,835

4 Claims. (Cl. 285—166)

This invention relates in general to connectors and more particularly to a detachable pipe fitting where it is desired to effect an airtight coupling and, at the same time, one which is readily detachable.

One of the primary objects of my invention is to provide an improved readily airtight pipe fitting which may be readily connected and disconnected.

Another object is to provide such a pipe fitting having interlocking male and female members wherein the male member carries an expansible snap ring and the female member an internal inwardly inclined chamfer to engage the seal to increasingly compress the same to provide an effectively sealed connection between the male and female members.

A further object is to provide such a pipe fitting having an interlocking female and male members, wherein one of the members carries therein a pipe, and wherein in addition to the expansible snap ring and compressing chamfer of the female member, the male and female members also have cooperating internal chamfers to cooperate with the expansible snap ring and chamfer to internally force the male and female members into sealing engagment with the external surface of the internal pipe.

Another object is to so construct the pipe fitting in which the male and female members have mating screw threads and in which the expansible snap ring carried by the male member is compressed to snap inwardly to the bottom of the screw threads of the female member in either direction as the screw connection is manually tightened or loosened.

With the foregoing and other objects in view, the invention resides in the combination of parts and in the details of construction hereinafter set forth in the following specification and appended claims, certain embodiments thereof being illustrated in the accompanying drawings, in which:

Figure 1:
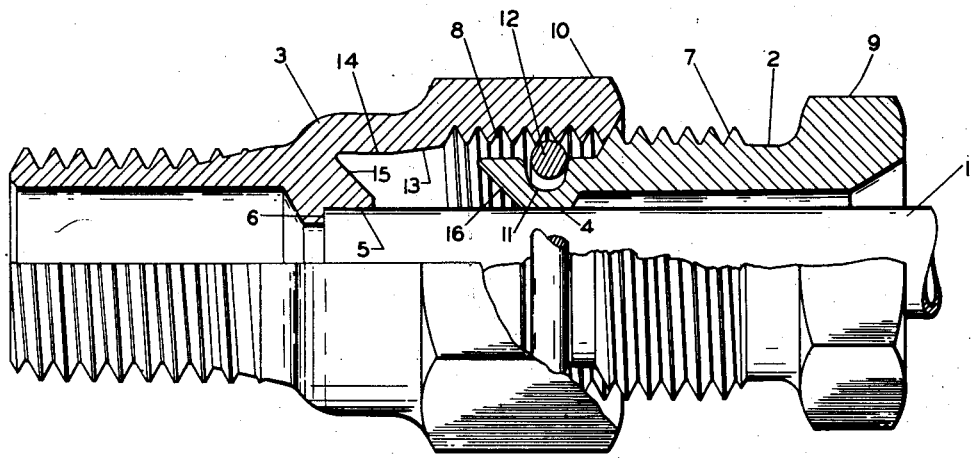
Figure 1 is a view partly in side elevation and partly in longitudinal section taken through the pipe fitting with the male and female members aligned and partially assembled.

Referring more particularly to the drawings, Figure 1 shows the pipe 1 centered in male member 2 and female member 3 of the pipe fitting by internal shoulder 4 of male member 2 and internal shoulder 5 of female member 3 and bottomed against internal shoulder 6 of female member 3. Male member 2 has external screw threads 7 to mate with internal screw threads 8 of female member 3. Male and female members 2 and 3 have wrench engageable heads 9 and 10.

Male member 2 is provided with a semi-circular circumferential groove 11 near its outer end past the screw threads 7 to receive an expansible snap ring 12. As shown in Figure 1, the fitting is aligned and ready for tightening. It will be noted that the normal inside diameter of the snap ring 12 is greater than the outside diameter of the bottom of the circumferential groove 11 in male member 2. To assemble the fitting, the male member is forced longitudinally into the female member. As this is done the expansible snap ring is compressed radially and is snapped past several internal teeth 8 until teeth 7 engage teeth 8. Then by grasping bolt heads 9 and 10 with appropriate tools a further tightening engagement of the threads is effected as the snap ring is carried forward into female member as it snaps past all the threads until the fitting assumes the tightened position of Figures 2 and 3.

As shown in the drawings, female member 3 is provided, internally of its threads 8, with a chamfer 13 and an adjoining straight section 14 of internal non-threaded surface. This chamfer 13 is in the form of a gradually decreasing inside diameter longitudinally of the female member. Its effect, in engagement with the expansible snap ring 12, is to further compress the latter to provide an effective seal.

Figure 2:
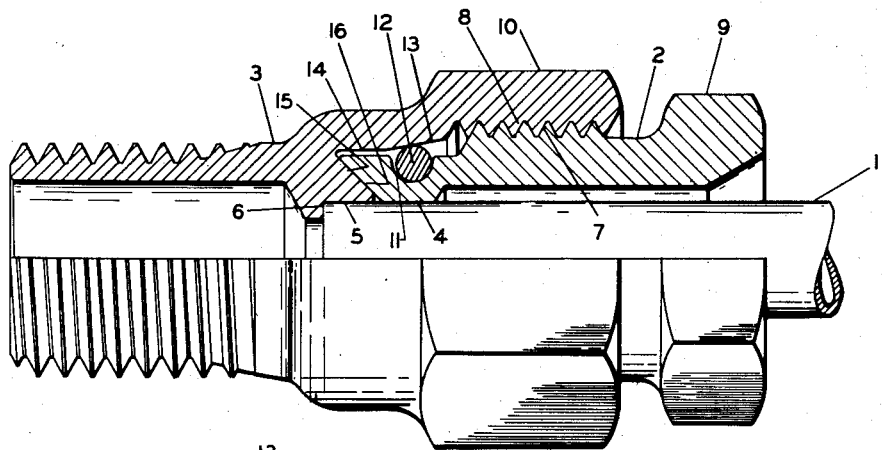
Figure 2 is a similar view, showing the fitting fully assembled.
Figure 3:
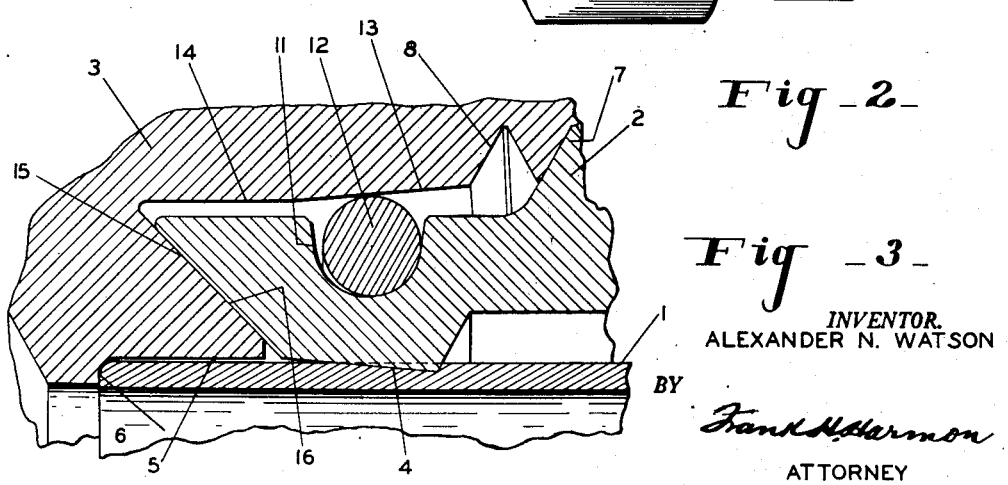
Figure 3 is an enlarged detail view of a fragmentary portion of the fitting to show the chamfers and expansible snap ring as the fitting is in the assembled position of Figure 2.

Between the inner surface 14 and surface 5 the internal flange of female member 3 is provided with a chamfer 15 against which the correspondingly chamfered end 16 of the male member bottoms when the fitting is fully tightened, as shown in Figures 2 and 3. The effect of the ramp action of chamfer 13 in compressing the snap ring 12 is to force the male member angularly inwardly down the chamfer 15 to bind the male member frictionally against the pipe 1 to cause its rear edge to slightly penetrate the pipe surface and to also force the female member angularly inwardly down the chamfer 16 to also bind the female member frictionally against the pipe.

Thus it will be seen that I have provided a pipe fitting in which the male and female members and seal are self-aligning, by the simple tightening operation of relative rotation of the male and female members, to create an effective seal between the male and female members and between these members and the pipe and simultaneously effect a clamping engagement between the male and female members and the pipe. The seal 12 is carried in by the male member as it merely snaps by the female member teeth 8 to be effectively clamped inwardly between chamfer 13 and groove 11. Also by means of the cooperating chamfers 15 and 16 the compressive force of chamfer 13 on seal 12 clamps the male and female members on the pipe in clamped and sealing engagement. Removal of the pipe fitting is just as easily effected by reverse relative manual rotation of the male and female members, as the seal merely snaps by the teeth 8 until the fitting assumes the disassembled relationship of Figure 1. Thus, the fitting and the seal may be installed and removed without replacement and without any disorganization of any part, or parts, of the pipe fitting.

I claim:

1. A detachable pipe coupling comprising a male member and a female member in which the pipe is carried, the main body portion of said male member having its inner surface annularly recessed to loosely receive the pipe with appreciable annular clearance and having an end portion with an axially elongated collar surrounding the pipe with relatively lesser clearance, an expansible aligning snap ring loosely carried in a circumferential groove near the end of said male member and past the screw-threads of said male member, the inner surface of said female member having an angularly radially inwardly extending chamfer to exert an angularly radially inward compressive force on said snap ring, the outer end of said male member being chamfered and the female member having an internal flange the front of which is chamfered correspondingly to the chamfered end of said male member as the latter is adapted to bottom against the chamfer of said internal flange, the compressive action of said first chamfer against said snap ring being adapted to provide a seal between said male and female members and, in cooperation of said abutting chamfers of said male and female members, to clamp said male and female members onto said pipe and provide a seal therebetween, the collar of said male member being adapted to be rocked axially to have one of its ends forced inwardly to penetrate the outer surface of said pipe upon manual tightening of the screw-threaded connection between said male and female members.

2. A detachable pipe coupling comprising a male member and a female member in which the pipe is carried, the main body portion of said male member having its inner surface annularly recessed to loosely receive the pipe with appreciable annular clearance and having an end portion with an axially elongated collar surrounding the pipe with relatively lesser clearance, said male and female members having mating screw threads, an expansible aligning snap ring loosely carried in a circumferential groove near the end of said male member and past the screw-threads of said male member, the inner surface of said female member having an angularly radially inwardly extending chamfer located longitudinally inwardly of the threads of the female member to exert an angularly radially inward compressive force on said snap ring, the outer end of said male member being chamfered and the female member having an internal flange the front face of which is chamfered toward the open male member receiving end of said female member and correspondingly to the chamfered end of said male member as the latter is adapted to bottom against the chamfer of said internal flange, the compressive action of said first chamfer against said snap ring being adapted to provide a seal between said male and female members, and in cooperation of said abutting chamfers of said male and female members, to clamp said male and female members onto said pipe and provide a seal therebetween, the collar of said male member being adapted to be rocked axially to have one of its ends forced inwardly to penetrate the outer surface of said pipe upon manual tightening of the screw-threaded connection between said male and female members.

3. A detachable pipe coupling comprising a male member and a female member in which the pipe is carried, the main body portion of said male member having its inner surface annularly recessed to loosely receive the pipe with appreciable annular clearance and having an end portion with an axially elongated collar surrounding the pipe with relatively lesser clearance, said male and female members having mating screw threads, an expansible aligning snap ring loosely carried in a circumferential groove in said male member past the screw threads thereof, the inner surface of said female member having an angularly radially inwardly extending chamfer located longitudinally inwardly of the teeth of the female member to exert an angularly radially inward compressive force on said snap ring, the outer end of said male member being chamfered and the female member having an internal flange the front face of which is chamfered toward the open male member receiving end of said female member and correspondingly to the chamfered end of said male member as the latter is adapted to bottom against the chamfer of said internal flange, the compressive action of said first chamfer against said snap ring being adapted to provide a seal between said male and female members and, in cooperation of said abutting chamfers of said male and female members, to clamp said male and female members onto said pipe and provide a seal therebetween, the collar of said male member being adapted to be rocked axially to have one of its ends forced inwardly to penetrate the outer surface of said pipe upon manual tightening of the screw-threaded connection between said male and female members.

4. A detachable pipe coupling comprising a male member and a female member in which the pipe is carried, the main body portion of said male member having its inner surface annularly recessed to loosely receive the pipe with appreciable annular clearance and having an end portion with an axially elongated collar surrounding the pipe with relatively lesser clearance, said male and female members having mating screw threads, an expansible aligning snap ring loosely carried in a circumferential groove near the end of said male member past the screw threads thereof, the inner surface of said female member having an angularly radially inwardly extending chamfer located longitudinally inwardly of the teeth of the female member to exert an angularly radially inward compressive force on said snap ring, the outer end of said male member being chamfered and the female member having an internal flange the front face of which is chamfered toward the open male member receiving end of said female member and correspondingly to the chamfered end of said male member as the latter is adapted to bottom against the chamfer of said internal flange, the compressive action of said first chamfer against said snap ring being adapted to provide a seal between said male and female members and, in cooperation of said abutting chamfers of said male and female members, to clamp said male and female members onto said pipe and provide a seal therebetween, the collar of said male member being adapted to be rocked axially to have one of its ends forced inwardly to penetrate the outer surface of said pipe upon manual tightening of the screw-threaded connection between said male and female members.

ALEXANDER N. WATSON.

REFERENCES CITED

The following references are of record in the file of this patent:

UNITED STATES PATENTS

| Number | Name | Date |
| --- | --- | --- |
| 1,037,238 | Glover | Sept. 3, 1912 |
| 1,143,815 | Duffy | June 22, 1915 |
| 2,008,096 | Clo | July 16, 1930 |
| 2,391,900 | Hobbs | Jan. 1, 1946 |
| 2,427,260 | Cowles | Sept. 9, 1948 |
| 2,458,833 | Carignan | Jan. 11, 1949 |
| 2,549,741 | Young | Apr. 17, 1951 |